Figure 1:
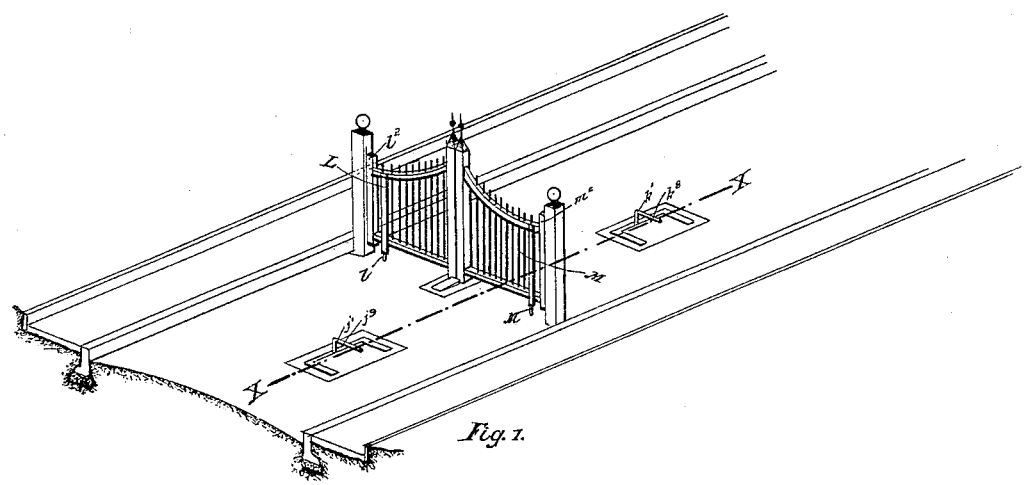

(No Model.)

J. C. LAPORTE.
AUTOMATIC GATE.

No. 459,007. Patented Sept. 8, 1891.

Witnesses.
James Laurin.
F. X. Malo

Inventor:
Joseph Camille Laporte
per: J. Emile Vanier
Attorney

United States Patent Office.

JOSEPH CAMILLE LAPORTE, OF POINTE BLEUE MISSION, QUEBEC, CANADA.

AUTOMATIC GATE.

SPECIFICATION forming part of Letters Patent No. 459,007, dated September 8, 1891.

Application filed February 5, 1891. Serial No. 380,329. (No model.)

*To all whom it may concern:*

Be it known that I, JOSEPH CAMILLE LAPORTE, priest, a citizen of the Dominion of Canada, residing at Pointe Bleue Mission, Lake St. John, and Province of Quebec, Canada, have invented certain new and useful Improvements in Automatic Gates; and I do hereby declare the following to be a full, clear, and exact description of the invention, such as will enable others skilled in the art to which it appertains to make and use the same.

My invention has reference to an automatic gate which is operated by means of the wheels or runners of the vehicles, for it is equally applicable in summer or winter, and is both opened and closed at the passage of any wagon, the wheels pressing on levers fixed to pulleys which operate a combination of ropes or chains in such a manner as to effect the desired opening and closing of the gate.

My invention has for its object to provide an automatic gate possessing simplicity of construction and perfect reliability of action, combined with cheapness of first cost, also as a relief to persons having many gates to open and close while driving.

Referring to the drawings, similar letters refer to similar parts throughout the several views.

Figure 2:
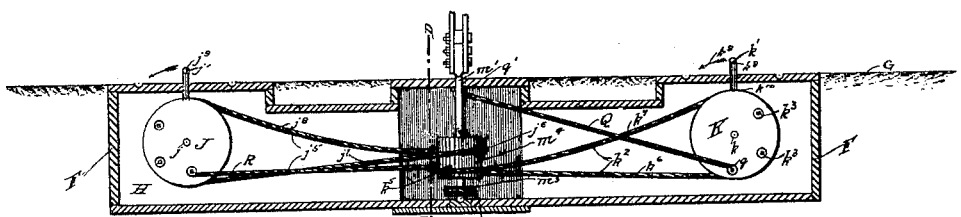
Figure 3:
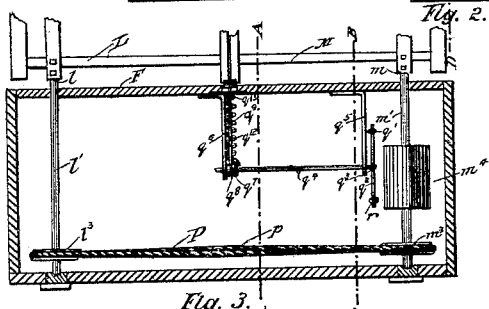
Figure 4:
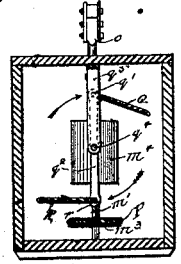
Figure 5:
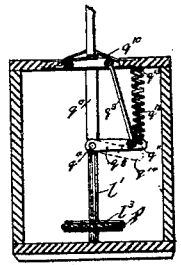
Figure 6:
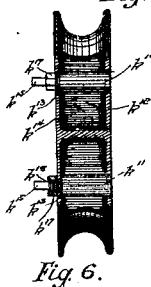
Figure 7:
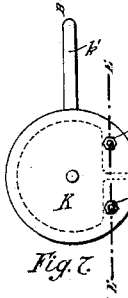
Figures 8, 9:
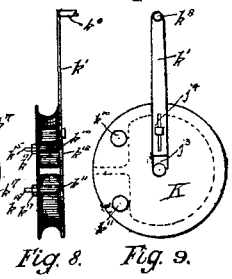
Figure 10:
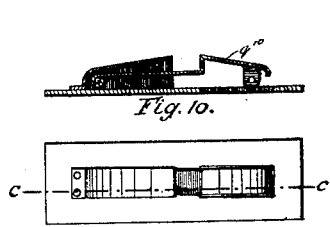
Figure 11:

Figure 1 is a perspective view of my gate. Fig. 2 is a section through line X X of Fig. 1. Fig. 3 is a section through line D D of Fig. 2. Fig. 4 is a section through line B B of Fig. 3. Fig. 5 is a section through line A A of Fig. 3. Fig. 6 is a section through line E E of Fig. 7. Fig. 7 is a side elevation of one of my main pulleys. Fig. 8 is a front elevation of same. Fig. 9 is an elevation of the reverse side of one of my main pulleys. Fig. 10 is a section through line C C of Fig. 11. Fig. 11 is a plan view of my gate-catch.

F is a box or pit made of wood or brick or any other suitable material, which is put underground, so that its top surface is about level with the street or road, as shown at G in Fig. 2. In its extremities I place the pulleys J and K, which are free to turn around their centers $j$ and $k$. To these pulleys are fixed the adjustable cranks $j'$ and $k'$ by means of set-screws $j^2$, (shown in Figs. 8 and 9,) the cranks $j'$ and $k'$ being lengthened or shortened at will, as they can be made to slide up and down in a recess $j^3$, cut out of the pulleys J and K. For this purpose I also provide the slot $j^4$ in the cranks $j'$ and $k'$, Fig. 9.

The gates L and M are pivoted at $l$ and $m$ on two vertical shafts $l'$ and $m'$, which are attached to the gates, as shown at $o$ in Fig. 4, or in any other suitable manner, and they are balanced by using counter-weights on the posts $l^2$ and $m^2$, or even using the posts $l^2$ and $m^2$ themselves for that purpose, so that the center of gravity will always be on the center line of shafts $l'$ and $m'$. To the shaft $l'$ is joined the pulley $l^3$, Fig. 3, and to the one $m'$ the drum $m^4$ and pulley $m^3$, the two pulleys $l^3$ and $m^3$ being joined by a reversing rope or chain P. The object of having the rope P crossed, as shown at $p$ in Fig. 3, is to reverse the circular motion of shaft $m'$.

To the pulley K, I attach the rope $k^2$ at $k^3$ and make it pass around the drum $m^4$, to which it is attached, as shown in Fig. 2 at $k^5$, in such a way that when the crank $k'$ is vertical the lower portion $k^6$ of the rope $k^2$ is nearly so, while the upper portion $k^7$ has slack sufficient to wind around one-fourth of the circumference of drum $m^4$ without deranging the vertical position of crank $k'$. On the other hand, I attach the rope Q at the point $q$ on the pulley K and to the end $q'$ of lever $q^2$, the latter being attached at its center $q^3$ to the small shaft $q^4$, which is supported by the two brackets $q^5$ and $q^6$, Fig. 3, and has its extremity $q^7$ provided with the arm $q^8$, the latter operating the connecting-rod $q^9$, which in turn is joined to the gate-catch $q^{10}$, Figs. 3, 5, 10, and 11, the end $q^{11}$ of arm $q^8$ being provided with the spring $q^{12}$, which is joined at $q^{13}$ to the top of the pit F, the object of this spring $q^{12}$ being to maintain the arm $q^8$ horizontally when not propelled out of this position by some outward influence. The horizontality of the arm $q^8$ of course means the vertical position for lever $q^2$, as the two are attached to the shaft $q^4$ at right angles to one another and as the rope Q is made tight when the crank $k'$ and lever $q^3$ are vertical. The spring $q^{12}$ also maintains the crank $k'$ in its vertical position.

The same remarks apply identically to the left-hand pulley J and its ropes $j^5$ and R— that is, the one $j^5$, attached to the drum $m^4$ at $j^6$, Fig. 2, has its lower portion $j^7$ tight when the crank $j'$ is vertical and the portion $j^8$ loose enough to permit its winding around the drum $m^4$ for one-quarter of its circumference without deranging its vertical position, and the rope R, attached to the end $r$ of the lever $q^3$, so that the spring $q^{12}$ also tends to always keep crank $j'$ vertical, as well as the one $k'$, the spring $q^{12}$ also keeping the catch $q^{10}$ up, as shown in Figs. 5 and 10.

Now to explain the working of my automatic gate, I will suppose a vehicle coming from right to left. The wheel, striking the handle $k^8$, pushes it forward and downward, as shown by the arrow $k^9$, Fig. 2, this having for effect to pull on the ropes $k^2$ and Q, the latter making the lever $q^3$ turn, as shown by the arrows in Fig. 4, and consequently it makes the arm $q^8$ take the position $q^{14}$, (shown in dotted lines in Fig. 5,) this pulling the catch $q^{10}$ down and freeing the gates L and M. At the same time the rope $k^2$ makes the drum $m^4$ revolve from left to right, and consequently shaft $m'$ and pulley $m^3$, the latter of course making the shaft $l'$ revolve in the opposite direction—that is, from right to left—and as the gates L and M are joined to these shafts $l'$ and $m'$ they consequently open wide. As the drum $m^4$ has only wound the top portion $k^7$ of the rope $k^2$ around one-quarter of its circumference—that is, the exact amount of slack left in it—the portion $k^7$ is loose, while the lever $k'$ is down of a quantity equal to the circumferential movement of the point $k^{10}$, so that the crank $k'$ is free to retake its vertical position without in any way interfering with the drum $m^4$, which it is immediately forced to do. After the arm $k^8$ is no more pressed down by the vehicle the spring $q^{12}$, which pushes up the catch $q^{10}$, makes the arm $q^8$ take its horizontal position and lever $q^3$ its vertical one, as of course its doing so pulls the rope Q and replaces the lever $k'$ vertically. However, the vehicle continuing its course comes in contact with the arm $j^9$ of the crank $j'$, which it presses down. This merely pulls on the upper portion $j^8$ of the rope $j^5$, which has all its slack wound around the drum $m^4$, and consequently makes it turn from right to left, this closing the gate, as can easily be seen, the gates weighing down the catch $q^{10}$ in closing. The rope R is loose while the gate is open, if the vehicle passes from right to left, the one Q being so if it passes from left to right. As can be seen, a vehicle passing in this latter direction would make exactly the same operations take place, only on the left-hand side pulley and rope.

To shorten or lengthen the ropes $j^5$ and $k^2$, I make use of the arrangement shown in Figs. 6, 7, and 8. As can be seen in Fig. 6, it simply consists of two cylindrical pieces $k^{10}$ and $k^{11}$, which pass through the side $k^{12}$ of my pulley and are provided with shoulders $k^{13}$ at their other ends, which abut against the side $k^{14}$ of my pulley, the cylinders $k^{10}$ and $k^{11}$ being continued from these shoulders by a square projection $k^{15}$, having its base next to the shoulder round and threaded, as shown at $k^{16}$ in Fig. 6, so that when a rope is attached to the cylinders $k^{10}$ and $k^{11}$ it can be wound thereon by means of a wrench applied to the square head $k^{15}$ and clamped at any desired point by means of the nut $k^{17}$, which clamps the shoulder $k^{13}$ up against the plate $k^{14}$. The ropes Q and R are regulated in length by a similar device. As can be seen, this arrangement can be used just as well for winter vehicles and could even be applied to railroad-crossing gates, the engine and train operating a device to keep them closed while passing.

Having described my invention, what I claim as mine, and desire to secure by Letters Patent, is—

1. In an automatic gate, the pulleys J and K, having the winding-cylinders $k^{10}$ and $k^{11}$, cranks $k'$ and $j'$, ropes $k^2$ and $j^5$, drum $m^4$, pulleys $l^3$ and $m^3$, shafts $l'$ and $m'$, and rope P, substantially as described, and for the purposes set forth.

2. In an automatic gate, the pulleys J and K, cranks $j'$ and $k'$, ropes Q and R, lever $q^2$, shaft $q^4$, brackets $q^5$ and $q^6$, arm $q^8$, spring $q^{12}$, and gate-catch $q^{10}$, substantially as described, and for the purposes set forth.

3. In an automatic gate, the gates proper L and M, with the pulleys J, K, $l^3$, and $m^3$, ropes $k^2$, Q, $j^5$, R, and P, shafts $l'$, $m'$, and $q^4$, drum $m^4$, lever $q^2$, arm $q^8$, spring $q^{12}$, gate-catch $q^{10}$, and brackets $q^5$ and $q^6$, substantially as described, and for the purposes set forth.

In testimony whereof I affix my signature in presence of two witnesses.

JOSEPH CAMILLE LAPORTE.

Witnesses:
ALOYS GLADEN,
THÉOPHILE PETIT.